Patented Feb. 8, 1938

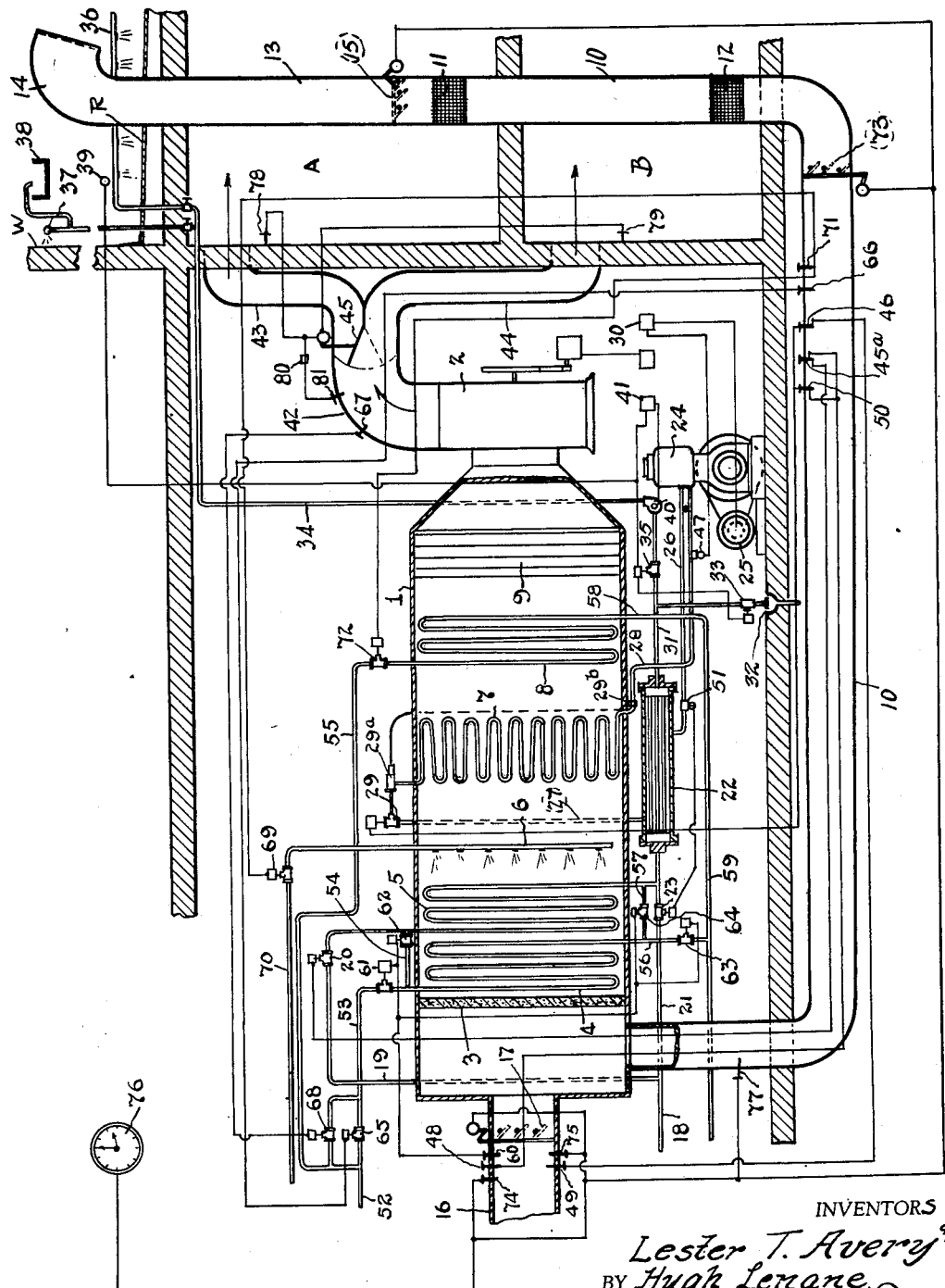

2,107,268

UNITED STATES PATENT OFFICE 2,107,268

APPARATUS FOR CONDITIONING AIR

Lester T. Avery, Shaker Heights, and Hugh Lenane, Euclid Village, Ohio, assignors to Avery Engineering Company, Cleveland, Ohio, a corporation of Ohio Application November 29, 1935, Serial No. 52,140

8 Claims. (Cl. 257—3)

This invention relates, as indicated, to an apparatus for conditioning air, but has reference more particularly to apparatus of this character which is adapted for use throughout the year, and for the various seasonal requirements.

One of the principal difficulties encountered in air conditioning is the variable load characteristic of the treated zone or space, in other words the variation from day to day and from hour to hour in the temperature and humidity of the space to be conditioned. This variation depends on a number of factors, among which may be noted (1) outside temperature, (2) outside relative humidity, or moisture content of the incoming air, (3) the heat gain in the occupied space resulting from lights, people, or other sources of heat and (4) the moisture gain in the occupied space from people or cooking devices, food, or other sources of moisture which may evaporate into the air.

Another factor, which is generally recognized, is the desirability of avoiding shocks to persons entering a room or zone from the outside, and resulting from too great a temperature and/or humidity difference between the outside and inside atmosphere. This problem has been solved to a certain extent by what is called differential control, which is accomplished by providing an outside thermostat which resets the inside thermostat so that with a gradually rising outside temperature, for example, above 70°, the inside thermostat will be reset for a gradually rising temperature, the ratio being about three to one, that is, one degree rise inside for every three degrees rise outside. This matter is being studied by engineers and physicians and in the course of time, rather definite schedules will undoubtedly be set up for proper inside temperatures and humidity for comfort, for health, and for the specific treatment and prevention of diseases.

Apparatus for properly conditioning air must therefore be sufficiently sensitive to respond to both constant and varying temperature and humidity conditions, both inside and outside the zones which are to be conditioned, and it is a primary object of the present invention to provide such apparatus.

Another object of the invention is to provide an apparatus which is designed to take advantage of all possible economies in operation, in water and power sources of cooling and dehumidifying, and in the use of outside air.

To the accomplishment of the foregoing and related ends, said invention, then, consists of the means hereinafter fully described and particularly pointed out in the claims; the annexed drawing and the following description setting forth in detail certain means and one mode illustrating, however, but one of the various ways in which the principle of the invention may be used.

In said annexed drawing:

The single figure of the drawing illustrates more or less diagrammatically an apparatus for conditioning air in which are embodied the principal features of the invention.

The apparatus, as thus illustrated, includes a conditioning unit comprising a casing or conduit 1, which is reasonably air-tight and through which the air is drawn by a fan 2, for delivery to zones or spaces A and B which are to be supplied with conditioned air. Disposed within the casing or conduit 1 are a filter 3 or similar means for removing dust particles and the like from the air to be treated, a cooling and heating coil 4, a cooling coil 5, a humidifier 6, a cooling and dehumidifying coil 7, a reheating coil 8, and eliminators 9 for trapping moisture entrained in the air stream.

For economy in operation, part of the air supplied to the spaces A and B is recirculated by drawing it into a return duct 10 through grills 11 and 12, from which duct it enters the casing 1 at a point in advance of the filter 3. That portion of the air which is not thus recirculated is discharged into the atmosphere through a vent duct 13 and vent hood 14, the amount of air thus discharged being controlled by dampers 15 disposed within the vent duct. In addition to the air thus recirculated, sufficient outside or make-up air is continuously drawn into the casing 1 to provide proper ventilation in the spaces A and B, as well as to maintain sufficient pressure in such spaces to prevent infiltration thereinto of air from the atmosphere or surrounding spaces. Such make-up air enters the casing 1 through a duct 16, the quantity thereof being controlled by dampers 17.

The conditioning unit, as above described, has a water-tight bottom and is preferably insulated.

Under cooling conditions, the air to be treated after passing through the filter 3, is initially cooled by the coils 4 and 5. These coils are cooled by means of water which circulates therethrough and is derived from the usual house water system or from a well, river, or spring, this water being relied upon to do as much of the cooling and dehumidifying of the air as it is capable of doing, depending, of course, on its temperature and the quantity available. The water from any of the stated sources enters a conduit 18, from which it may pass directly into the coil 5 by way of the conduit 19 and into the coil 4 by way of conduits 19 and 54, the quantity of water being controlled by an automatically operated valve 20. After its passage through the coils 4 and 5, the water, the temperature of which has been increased but slightly by the air in its passage over the coils, enters a conduit 21 which interconnects the supply conduit 18 with the cooling coil of a condenser 22, the water leaving the coil 4 by way of a branch conduit 57. It will be understood that when the coil 4 is thus used for cooling purposes, the valve 61 in a steam or hot water supply conduit 53 for this coil is closed and valve 62 in conduit 54 open, and that the valve 63 in the discharge conduit 56 of coil 4 is closed and valve 64 in conduit 57 open. The quantity of water which may pass through the conduit 21 is controlled by an automatically operated valve 23.

The precooled air is further cooled and dehumidified by means of the cooling coil 7, which is supplied with a refrigerant derived from a refrigerating system which comprises a compressor 24 operated by motor 25, discharge conduit 26, condenser 22, liquid refrigerant conduit 27, coil 7, and compressor intake conduit 28. The flow of refrigerant passing through conduit 27 is controlled by means of automatically operated valves 29 and 29A. The motor 25 is controlled by a starter 30.

As previously stated, the water which has been utilized for precooling purposes is still relatively cold and may therefore be used for condensing the refrigerant in the condenser 22, the water entering the condenser coils by way of the conduit 21 and being discharged from the condenser through a conduit 31.

The water thus discharged from the condenser may be discharged to a sewer drain 32 through an automatically operated valve 33 or may be conducted as by means of a conduit 34 through an automatically operated valve 35 to a spray cooling system 36 on the roof R of the conditioned space A, or a spray cooling system 37 for the wall W of a conditioned space. The water which is not discharged to the sewer or utilized for spray cooling purposes may be discharged into a tank 38 to be used for such purposes in the building as washing, flushing toilets, etc., or in lieu of sprays, such water could be permitted to trickle down the sides of the building to offset the heat of the sun on the outside walls of the conditioned spaces.

The valves 33 and 35 may be responsive to a photoelectric cell 39 on the roof R or to a heat-sensitive device, whereby, as the spray requirements are increased in accordance with the light and/or heat conditions on the roof, more water will be available for such purposes and less discharged to the sewer. In buildings where the water pressure is not sufficient to force the water to the roof, a small circulating pump 40 may be interposed in the water line 34 to force the water to the roof. The pump 40 is operated from a starter 41, it being understood that the pump is started when the valve 33 is closed and the valve 35 open.

By utilizing the precooling water in the foregoing manner, its cooling properties are conserved instead of being wasted, and economical operation of the conditioning system is assured.

The air which has now been conditioned by the coils 4, 5 and 7, passes through the eliminators 9, whereby moisture entrained in the air is trapped, and into a manifold duct 42. The conditioned air is discharged from the duct 42 into smaller branch ducts 43 and 44, which are respectively in communication with the zone or spaces A and B, which are to be treated or supplied with the conditioned air. An automatically operated damper or valve 45 is mounted at the junction of the duct 42 with the branch ducts 43 and 44 for the purpose of dividing the total supply of conditioned air for apportionment to the spaces A and B in accordance with the load or air requirements of such spaces.

For the purpose of properly conditioning the air for the zones or spaces A and B, the various steps or operations which have been described are automatically controlled by means of suitable thermostats, humidostats, pressurestats and other control instruments or devices. These controls will now be described.

The supply of cold water to the coils 4 and 5 is controlled by the valve 20, the actuation of which is automatically responsive to the temperature in the treated zones A and B, i. e., the temperature in the recirculating duct 10, this temperature being indicated by a thermostat 45a in said duct.

The supply of refrigerant in the coil 7 is dependent upon or responsive to the relative humidity in the treated zones A and B, i. e., the humidity of the air in the recirculating duct 10, this humidity being indicated by a humidostat 46 in said duct. This humidostat controls the starting and stopping of the compressor 24 by actuating valve 29 which permits the liquid refrigerant to pass into the coil 7, the rising pressure of the refrigerant in this coil actuating a pressurestat 47 in the conduit 28, which in turn energizes the starter 30 of the compressor motor 25. The valve 29a is an expansion valve which is automatically responsive to a thermostat 29b associated with conduit 28, and is designed to maintain the desired temperature within the refrigerating coil 7 regardless of the load requirements of the refrigerating system.

The instruments 45a and 46 may be constant-set instruments, or may be of the differential type, in which case they may be reset in accordance with atmospheric conditions by thermostat 48 and humidostat 49 respectively, disposed in the air intake duct 16.

A thermostat 50 may also be provided in the recirculating duct 10 and in the same circuit as the humidostat 46 for the purpose of starting and stopping the compressor 24 in the same manner as the humidostat 46, but at a somewhat higher temperature level than the thermostat 45a, which controls the water supply only. The thermostat 50 may likewise be a constant set instrument or may be reset by means of the thermostat 48. With this arrangement, it will be seen that the first step in cooling the air to be conditioned is to start the flow of cold water through the precooling coils 4 and 5. If dehumidifying or further cooling is required, humidostat 46, and thermostat 50 will start operation of the refrigerating system. Conversely, if the refrigerating system is operating in response to the requirements of humidostat 46, the temperature may drop to such a point that the thermostat 45a might close the valve 20. Provision is therefore made for utilizing the cold water supply to take care of the additional condenser-cooling requirements of the refrigerating system in such case. For this purpose, the automatically operated valve 23 is provided in the by-pass conduit 21, and this valve will open in response to the increased pressure in conduit 26, which is indicated by a pressurestat 51. In this way, a sufficient flow of cooling water for the condenser 22 is at all times assured. The valve 23 may, if desired, be actuated in response to a thermostat (not shown) in the inlet or outlet conduit of the condenser 22.

By operating the apparatus in the aforesaid manner, the temperature and humidity in the conditioned spaces can be controlled within ordinary commercial limits. For more accurate control of humidity, which may be necessary for therapeutic or industrial work, reheating coil 8 is utilized, which may be supplied with steam or hot water by a conduit 55, the flow of such steam or hot water being controlled by an automatic valve 72, actuation of which is responsive to a humidostat 71 in the recirculating duct 10. The hot water or condensed steam from coil 8 is discharged way of a conduit 58 into a discharge conduit 59.

In the heating cycle, when it is desired to condition the air by heating it and adding moisture thereto, the coil 4 and humidifier 6 are utilized. The coil 4 is supplied with steam or hot water by a conduit 52, such steam or hot water entering the coil 4 by means of a conduit 53 and the condensed steam or water leaving this coil by means of conduit 56, which is connected with discharge conduit 59.

The use of coil 4 for heating instead of cooling is effected by a thermostat 60 in the air duct 16, which thermostat, under proper temperature conditions, closes valves 62 and 64 and opens valves 61 and 63 so as to permit steam or hot water to enter the coil 4 through conduit 53 and prevent cold water from entering this coil by way of conduits 19 and 57. The control of the quantity of steam or hot water passing through coil 4 may then be regulated in accordance with the heating requirements by means of automatic valve 65, which is responsive to a thermostat 66 in the recirculating duct 10.

In order to maintain the air in the delivery duct 42 above a predetermined minimum temperature for preventing cold blasts or drafts, the valve 65 may be controlled by a thermostat 67 in said duct, but this function is preferably accomplished by actuating in response to the thermostat 67 a separate automatic valve 68 which controls the hot water or steam supply to the coil 4.

If the air in the recirculating duct 10 is too dry, moisture may be added thereto by means of the humidifier 6, which may be a steam or water spray or other common moisture supply system, the control of which is effected by an automatic valve 69 in the supply conduit 70, this valve being responsive to a humidostat 71 in the duct 10.

As previously stated, the damper 17 controls the quantity of make-up air required for minimum ventilation needs, and this damper is normally partially closed while the damper 73 in the duct 10, which controls the quantity of air recirculated, is fully open and the vent damper 15 closed or almost closed. The system is then in what is known as recirculating position. The relative positions of dampers 15, 17 and 73 may be controlled by the thermostat 48, or as shown in the drawing, may be controlled by a thermostat 74 in the duct 16 and a humidostat 75 in said duct. Thermostat 74 and humidostat 75 operate dampers 15, 17 and 73 in such a manner that when the outside air is above or below predetermined points in temperature and humidity, the dampers are set in recirculating position, but when the outside air is between these desired limits of temperature and humidity, the damper 17 will open fully, the damper 73 will partially close and the damper 15 open fully. This will permit the outside air to be used for ventilating and conditioning purposes when such air is within the range desired for conditioning, thus affording great economy in operation. The dampers 15, 17, and 73 may also be operated by a time clock 75 which may be set to move the dampers into full ventilating position at certain periods during the day in order to scavenge food and other odors which may have accumulated, as for example, in a restaurant, during a heavy rush period. The dampers may also be operated in response to an instrument 77 which is sensitive to smoke. Such instruments, operating independently of outside temperature or humidity conditions, fill a very great need in the industry, particularly in restaurants and bar rooms, where, at certain times, a large quantity of air is required to prevent stale odors. At other times, the system may, of course, operate efficiently as a recirculating system.

The foregoing description is based on the presumption that the load in two or more conditioned zones or spaces is uniform, which, of course, is rarely the case. If this conditioning system is used to supply two or more zones or spaces A and B, the load requirement in these separate zones may differ to a varying degree. For the purpose of meeting these varying load requirements, the damper or valve 45 is automatically operated so as to divert to the branch ducts 43 and 44 more or less of the conditioned air as may be required for the zones A and B.

The damper 45 is moved in response to thermostats 78 and 79 in the zones A and B respectively or in the return duct behind grills 11 and 12. If, for example, the thermostat 79 is higher in temperature than thermostat 78, the damper 45 will be moved in such direction as to permit more cool air to be supplied to the zone sensed by thermostat 79. This movement occurs, of course, when the system is used for cooling. When the system is used for heating, however, the damper will be moved in such direction as to permit more hot air to be supplied to the zone sensed by thermostat 78. For this purpose, a reversing mechanism is employed for reversing the direction of the motor which operates damper 45, and this reversing mechanism is controlled by a thermostat 81 in the supply duct 42. This reversal occurs when the air delivered to the conditioned space is above the temperature of the conditioned space, the thermostat 81 being ordinarily set at about 72° F. After such reversal, if thermostat 79 indicates a temperature above that of thermostat 78, the damper will move to a position to permit less warm air to pass to the zone sensed by thermostat 79. The advantage of the foregoing arrangement lies in the fact that the thermostats 78 and 79 may vary through a wide range, that is from 70° F. to 80° F., and yet at all temperatures within this range, they will equalize the temperatures in the two zones under consideration. Furthermore, it permits the system to pass from a heating to a cooling cycle in a completely automatic manner so as to take care of the problems encountered in the spring and fall seasons and at certain unseasonal periods during the winter and summer.

Although all humidity sensitive instruments have been described herein as humidostats, it is to be understood that instruments sensitive to wet bulb or dew point may be used instead of such humidostats.

It is seen that an air conditioning method and apparatus have been provided in which completely automatic regulation of heating, humidifying, cooling, dehumidifying and ventilation are secured without necessitating manual resetting of controls, in which great economy in the use of water and power for cooling and dehumidifying is obtained, in which accurate control of temperature and humidity at a minimim operating cost is attained, in which effective use is made of water for cooling, dehumidifying and removal of heat from the conditioned spaces, and in which the automatic control of ventilation permits maximum economy in the use of outside air and automatic or semi-automatic elimination of odors due to too much recirculated air.

Other modes of applying the principle of our invention may be employed instead of the one explained, change being made as regards the means and the steps herein disclosed, provided those stated by any of the following claims or their equivalent be employed.

We therefore particularly point out and distinctly claim as our invention:—

1. In an apparatus for conditioning air, the combination of a water-cooled cooling means for initially cooling the air, a refrigerating system for further cooling the air, said system having a condenser supplied with water from said cooling means, means responsive to a function of the psychrometric condition of the air for regulating the flow of water through said cooling means and for operating said refrigerating system, and means responsive to the temperature of said condenser for supplying to said condenser cooling water additional to that supplied from said cooling means.

2. In an apparatus for conditioning air, the combination of a water-cooled cooling coil for initially cooling the air, a refrigerating system for further cooling the air, said system having a condenser supplied with water from said cooling coil, means responsive to a function of the psychrometric condition of the air for regulating the flow of water through said cooling coil and for operating said refrigerating system, and means responsive to the temperature of said condenser for supplying to said condenser cooling water additional to that supplied from said cooling coil.

3. In an apparatus for conditioning air, the combination of means for initially conditioning the air, a cold water supply for said conditioning means, a refrigeration system including a water-cooled condenser and an air conditioning coil, means responsive to a function of the psychrometric condition of the air for regulating the flow of water through said initial conditioning means and the flow of refrigerant through said cooling coil, and means for mixing water used for cooling said initial conditioning means with unused water from said supply for cooling said condenser.

4. In an apparatus for conditioning air, the combination of a coil for initially conditioning the air, a cold water supply for said coil, a refrigeration system including a water-cooled condenser and an air conditioning coil, means responsive to a function of the psychrometric condition of the air for regulating the flow of water through said initial conditioning coil and the flow of refrigerant through said second-named conditioning coil, and means for mixing water used for cooling said initial conditioning coil with unused water from said supply for cooling said condenser.

5. In an apparatus for conditioning air, the combination of an initial coil for either heating or cooling, a cold-water supply for said coil, a secondary cooling coil, a refrigerating system for further cooling of the air, said system having a condenser cooled by water from said first-named coil, means responsive to a function of the psychrometric condition of the air for regulating the flow of water through said first-named cooling coil and said condenser and for operating said refrigerating system, and means responsive to air temperature for supplying a heating fluid instead of cooling water to said first-named coil.

6. In an apparatus for conditioning air, the combination of a coil for initially conditioning the air, a cold water supply for said coil, a refrigerating system including a water cooled condenser and an air conditioning coil, means responsive to a function of the psychrometric condition of the air for regulating the flow of water through the initial conditioning coil and the flow of refrigerant through said second conditioning coil, means for by-passing a portion of said water supply around said first-named coil to said condenser, and means responsive to a function of the psychrometric condition of the outside air for controlling the proportion of outside air admitted into said apparatus for assisting in the conditioning.

7. In an apparatus for conditioning air, the combination of a coil for initially conditioning the air, a cold water supply for said coil, a refrigerating system including a water-cooled condenser and an air conditioning coil, means responsive to a function of the psychrometric condition of the air for regulating the flow of water through said initial conditioning coil, and the flow of refrigerant through the second conditioning coil, means for by-passing a portion of said water supply around said initial conditioning coil to said condenser for cooling the latter, and means for admitting outside air into said apparatus at predetermined intervals of time.

8. In an apparatus for conditioning air in a single stream, the combination of a watercooled conditioning coil, a refrigerant-cooled conditioning coil, a fluid-heated heating coil, all of said coils being arranged for flow of air in series therethrough and means responsive to a function of the psychrometric condition of the air to control the flow of water through said first-named coil, the flow of refrigerant through said second-named coil and the flow of heating fluid through said third-named coil.

LESTER T. AVERY.
HUGH LENANE.